(12) United States Patent
Reddy et al.

(10) Patent No.: US 11,475,761 B2
(45) Date of Patent: Oct. 18, 2022

(54) SYSTEM AND METHOD FOR SMART DEVICE MANAGEMENT

(71) Applicant: ARRIS Enterprises LLC, Suwanee, GA (US)

(72) Inventors: Nethravathi Reddy, Bangalore (IN); Sathish Kumar Mani, Bangalore (IN); Pavan Kumar Addepalli, Bengaluru (IN)

(73) Assignee: ARRIS ENTERPRISES LLC, Suwanee, GA (US)

( * ) Notice: Subject to any disclaimer, the term of this patent is extended or adjusted under 35 U.S.C. 154(b) by 0 days.

(21) Appl. No.: 17/351,547

(22) Filed: Jun. 18, 2021

(65) Prior Publication Data

US 2022/0028252 A1 Jan. 27, 2022

Related U.S. Application Data

(60) Provisional application No. 63/056,251, filed on Jul. 24, 2020.

(51) Int. Cl.
*G08C 17/02* (2006.01)
*H04L 67/12* (2022.01)

(52) U.S. Cl.
CPC ............. *G08C 17/02* (2013.01); *H04L 67/12* (2013.01); *G08C 2201/30* (2013.01); *G08C 2201/42* (2013.01); *G08C 2201/93* (2013.01)

(58) Field of Classification Search
CPC .......................... G08C 17/02; G08C 2201/30; G08C 2201/42; G08C 2201/93; H04L 67/12; H04L 67/125; H04L 67/565; H04L 69/08; H04L 69/18; H04L 12/282; H04L 12/2818; H04L 12/2803
See application file for complete search history.

(56) References Cited

U.S. PATENT DOCUMENTS

| | | | | |
|---|---|---|---|---|
| 9,215,394 | B2* | 12/2015 | Barnett | .................. H04B 1/205 |
| 9,667,804 | B1* | 5/2017 | Hall | ..................... H04L 12/6418 |
| 10,397,013 | B1* | 8/2019 | Hill | ........................ H04L 12/281 |
| 2004/0260427 | A1 | 12/2004 | Wimsatt | |
| 2007/0229465 | A1* | 10/2007 | Sakai | ..................... H04B 1/202 |
| | | | | 345/173 |
| 2013/0183944 | A1 | 7/2013 | Mozer et al. | |

(Continued)

FOREIGN PATENT DOCUMENTS

WO 2017201001 A1 11/2017

OTHER PUBLICATIONS

International Search Report and Written Opinion for Application No. PCT/US2021/038031 dated Sep. 23, 2021.

*Primary Examiner* — Adnan Aziz
(74) *Attorney, Agent, or Firm* — Botos Churchill IP Law LLP

(57) ABSTRACT

A system and method for the centralized access and management of multiple IoT systems is provided via a networked media hub. The media hub functions as a nexus for multiple IoT systems, providing a familiar, single-point user interface enabling the aggregation of information from, and the transmission of user commands to various, disparate IoT systems. The hub also enables interaction between the connected IoT systems, providing a point of connection and management for previously isolated IoT systems.

24 Claims, 3 Drawing Sheets

(56) References Cited

U.S. PATENT DOCUMENTS

| | | | |
|---|---|---|---|
| 2013/0322846 A1* | 12/2013 | Ferren | G06Q 30/0201 386/234 |
| 2014/0181335 A1* | 6/2014 | Han | H04L 12/2832 710/33 |
| 2015/0100618 A1* | 4/2015 | Le Guen | H04L 65/1036 709/201 |
| 2015/0347114 A1* | 12/2015 | Yoon | H04L 12/2832 717/176 |
| 2016/0249395 A1 | 8/2016 | Logue et al. | |
| 2016/0378082 A1* | 12/2016 | Fisher | H04L 12/2816 700/275 |
| 2017/0277372 A1* | 9/2017 | Choi | H04L 12/40013 |
| 2020/0120163 A1* | 4/2020 | Gargi | G06F 9/451 |
| 2020/0213193 A1* | 7/2020 | Newell | H04W 4/70 |

\* cited by examiner

SYSTEM AND METHOD FOR SMART DEVICE MANAGEMENT

CROSS-REFERENCE TO RELATED APPLICATION

This application claims the benefit of U.S. Provisional Patent Application 63/056,251, filed Jul. 24, 2020, which is incorporated by reference herein in its entirety.

BACKGROUND OF THE INVENTION

The ever-increasing bandwidth and availability of internet access, combined with the proliferation of networked, smart devices for residential use has led to the Internet-of-Things (IoT) becoming a reality in within many home environments. Residential users can choose from a wide variety of IoT devices that enable them to remotely access, monitor, control and automate a variety of systems and appliances. However, although IoT devices provide a user with an array of control opportunities, they can pose a daunting integration and control problem.

For example, a given residence might have several disparate IoT device systems, each utilizing its own particular command and control protocol and user interface. An IoT system adapted to control residential lighting may be utilizing one protocol and user interface, while in the same residence an IoT environmental control system utilizes an entirely different protocol and user interface. The disparate protocols and user interfaces utilized by the systems being wholly separate and incompatible. The residential user cannot integrate the operation and function of these two IoT systems, nor can the user access the systems via a common user interface. This problem is compounded as the number of IoT systems within a given residence increases. FIG. 1 provides a functional block diagram of a typical residential environment that includes three prior-art IoT systems. Each of the IoT systems includes a dedicated IoT hub (102, 104 and 106) utilizing a specific protocol to communicate with an associated IoT device or system.

IoT hub 102 is dedicated to controlling lighting devices within the residence. Hub 102 communicates with a user interface device (smartphone 108 running a dedicated application) via an 802.11 Wi-Fi connection (110) and with the individual lighting devices (112, 114) being controlled via a Zig-Bee wireless network (116). Both the W-Fi and Zig-Bee communications utilize protocols that are specific to IoT hub 102 and adapted to interface exclusively with the controlled lighting devices and the dedicated lighting-control application running on a networked smartphone. IoT hub 104 controls HVAC system 118 within the residence, utilizing ethernet connection 120 to communicate with the HVAC system and an 802.11 Wi-Fi connection 122 to support a user interface (laptop computer 124 running a dedicated application). The Ethernet and W-Fi communication utilize protocols specific to IoT hub 104 and are adapted to interface exclusively with the HVAC system 118 and the user interface supported by the dedicated application running on laptop computer 124. The third IoT hub, 106, interfaces with appliance 126 and smartphone 108 via 802.11 Wi-Fi connections (128 and 130, respectively). The protocols employed are exclusive to appliance 126 and the user interface supported by the dedicated appliance-control application being run on smartphone 108.

The three IoT systems exist in isolation from one another, utilizing disparate protocols to control wholly separate systems within the residence. Even in the case where two IoT system share the same physical device as a user interface (IoT hubs 102 and 106 both utilize smartphone 108), the physical device must run two separate applications, each devoted to the control of only one IoT system, and completely isolated from the other. The need for separate user interfaces, each communicating with an IoT system that is isolated from all other IoT systems within a residence is both inefficient and cumbersome.

Presently IoT systems and devices are available to control numerous residential systems and devices, such as appliances, automobiles, entertainment systems, information systems, as well as lighting and environmental controls. The proliferation, scope and functionality of such IoT systems will only be increasing. The number and variety of IoT systems that will likely populate a given residence in the very near future necessitates the provision of a single-point means of accessing, managing and integrating the operation of disparate IoT systems so as to provide users with a seamless and simplified home automation experience.

BRIEF SUMMARY OF THE INVENTION

A system and method for the centralized control, access and management of multiple IoT systems is provided via a networked media hub. The media hub functions as a nexus for multiple IoT systems, providing a familiar, single-point user interface enabling the aggregation of information from, and the transmission of user commands to various, disparate IoT systems. The hub also enables interaction between the connected IoT systems, providing a point of connection and management for previously isolated IoT systems.

BRIEF DESCRIPTION OF THE DRAWINGS

The aspects, and advantages of the present invention will become better understood with regard to the following description, appended claims, and accompanying drawings in which:

DETAILED DESCRIPTION

Figure 1:
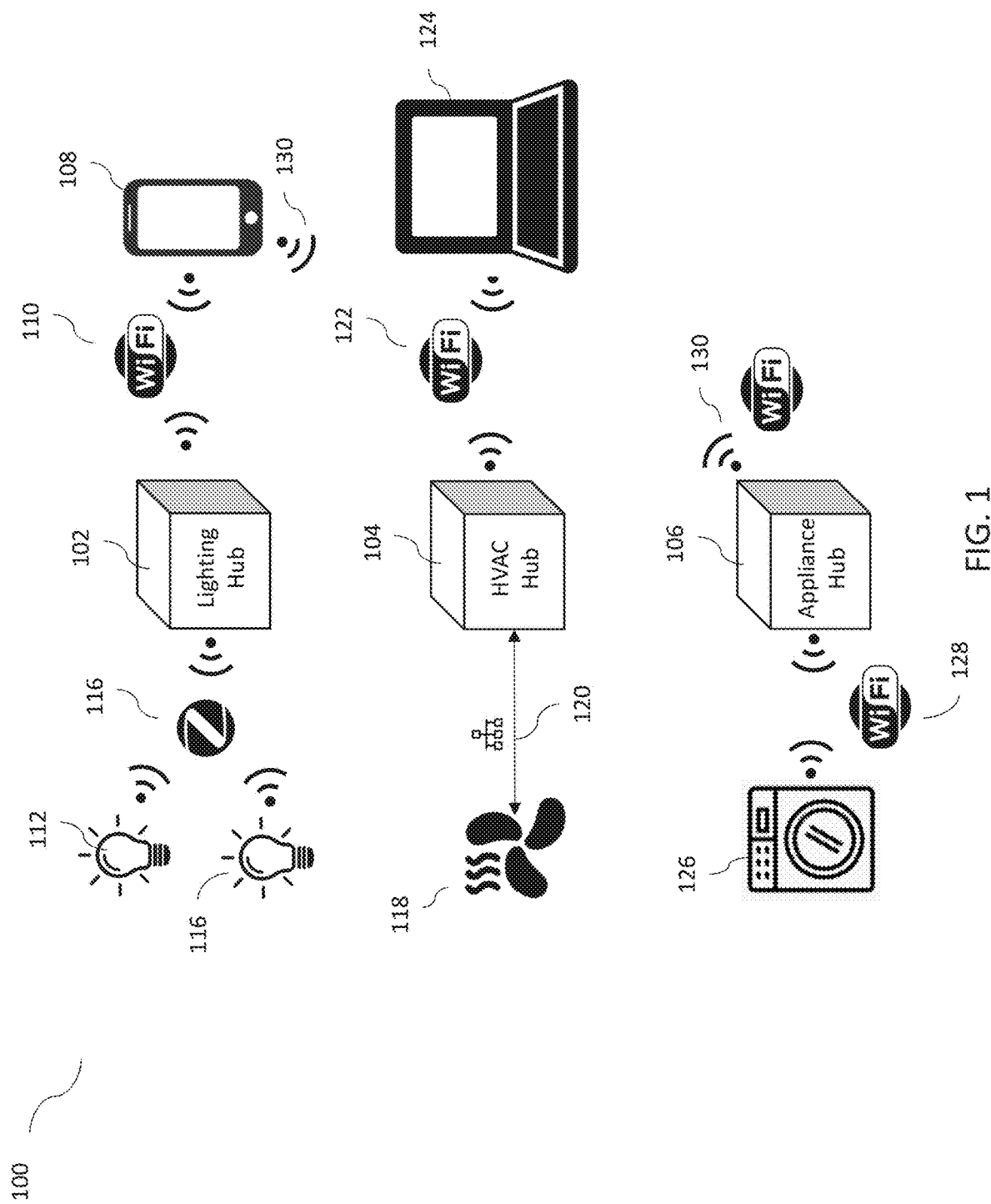
FIG. 1 is a functional diagram depicting prior-art IOT systems.
Figure 2:
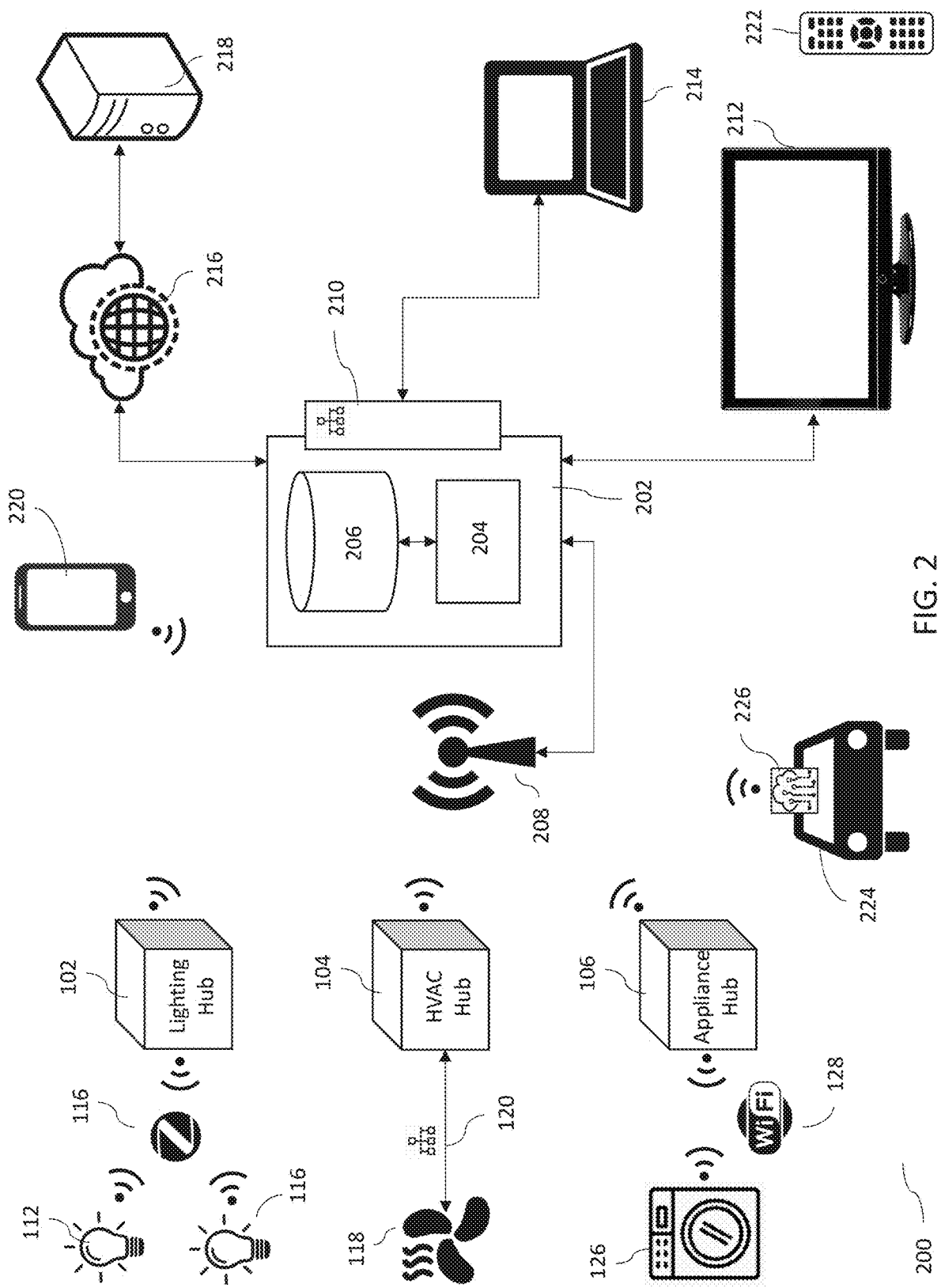
FIG. 2 is a is a flow diagram of a first preferred embodiment of a centralized access and management system for multiple IoT systems.

FIG. 2 is a functional diagram of a preferred embodiment for a smart device management system. As shown, the system 200 comprises media hub 202 which serves as a controller and nexus for the system. Media hub 202 includes processor 204 adapted to run processes within a given operating system, and memory 206, Wi-Fi transceiver 208 and wired interface (such as Ethernet) 210. In addition, media hub 202 is shown to interface with digital television 212, laptop computer and external network 216.

Also shown in FIG. 2 are IoT hubs 102, 104 and 106, which respectively control lighting devices (112, 114), an HVAC system (118) and an appliance (126). The functionality of these IoT hubs was described previously, and will not be repeated here. Each of the hubs utilizes a disparate, non-mutually compatible protocol to communicate with the system or devices being controlled. In addition, each of the hubs employs its own particular, non-mutually compatible protocol for communicating with a user interface.

Wi-Fi transceiver 208 is adapted to facilitate radio frequency ("RF") communications with IoT hubs 102, 104 and 106. Memory 206 within media hub includes information that enables processor 204 to receive, process and generate information encoded in accordance with the respective protocols employed by each of the three IoT hubs when communicating with a user interface. Programs and platforms adapted to communicate with multiple, dissimilar IoT protocols are well known in the art and will not be discussed in detail here. One example of such is the Home Assistant platform or Hass.io offered by Home Assistant, Inc. of San Diego, Calif. Such platforms enable the processing and interpretation of dissimilar IoT system protocol commands, as well as the issuance of dissimilar IoT system protocol commands by a system, such as media hub 202, running its particular operating system.

For example, information encoded in accordance with a protocol specific to IoT hub 104 and related to the operation of HVAC system 118 is communicated via Wi-Fi from IoT hub 104 to Wi-Fi transceiver 208. The information is then received by media hub 202. Processor 204, utilizing information stored in memory 206 and/or obtained from remote server 218 via public network 216, recognizes the particular protocol and processes the incoming information so that it can be understood and utilized by media hub 202. The same would occur for information received from IoT hub 102 or IoT hub 106. The received information would be recognized and converted to a format that could be processed and understood by media hub 202.

Media hub 202 is also adapted to utilize processor 204 to issue commands to connected the IoT hubs (102, 104 and 106). A given command would be generated by processor 204 in accordance with one or more processes running upon the operating system of media hub 202. This command would be designated as intended for a particular IoT system and then, utilizing information stored in memory 206 and/or obtained from remote server 218 via public network 216, the command would be converted to conform to the protocol associated with the particular IoT system. If, for example, the command directed lighting device 112 to produce green light, processor 204 would convert it to a protocol associated with IoT hub 102 and cause Wi-Fi transceiver 208 to transmit the command information. The information would be received by IoT hub 102 and instruct the hub to transmit (via Zig-Bee RF) a command to generate green light to lighting device 112.

The ability to serve as a common platform for transceiving IoT system information conforming to multiple disparate protocols enables the media hub 202 to provide a common user interface for the control of multiple, otherwise unrelated IoT systems. An example of one such graphical user interface ("GUI") is provided in FIG. 3. This GUI provides information indicative of the state of an HVAC control system (302), a lighting control system (304) and an appliance control system (306) on a single screen (308). A user may modify the state of various IoT devices and systems by manipulating the screen via a pointing device (mouse, trackball) or by touch, if the screen is so adapted). For example, to increase the intensity of Bedroom Light 1, a user would swipe bar 310 from left to right (in the case of a touch screen) or click on the right side of the bar with a pointing device. This one screen would enable a user to take similar action to control the state and operation of heating and cooling systems, and home appliances.

The capacity of media hub 202 to serve as a single point of management and control for the disparate IoT systems and hubs gives rise to the ability to enable the previously unconnected IoT systems interact with one another. This interaction could take the form of a conditional interaction, often referred to as "if this, then that" interaction. For example, media hub 202 controls and monitors the state of lights designated as bedroom lights via IoT hub 102, and controls and monitors the temperature in an area designated bedroom via IoT hub 104. A user could utilize an interface to provide media hub 202 with the following instruction:

If Bedroom Lights 1 and 2 are both off for more than 30 minutes,

Then set the Bedroom temperature to 65°.

Such an instruction could minimize heating costs of the bedroom when it is unoccupied, or lower the temperature after the occupant was asleep. The particulars of the If/Then interaction between the various IoT systems is not critical; but rather the ability of the disclosed system to enable such interdependent IoT activity among previously isolated IoT systems. The particular interface utilized to construct a command could be a GUI providing a graphical menu of devices, actions and results, or a computer wherein a user could enter a specific command syntax. Such interfaces are well-known in the art and will not be discussed further herein.

Figure 3:
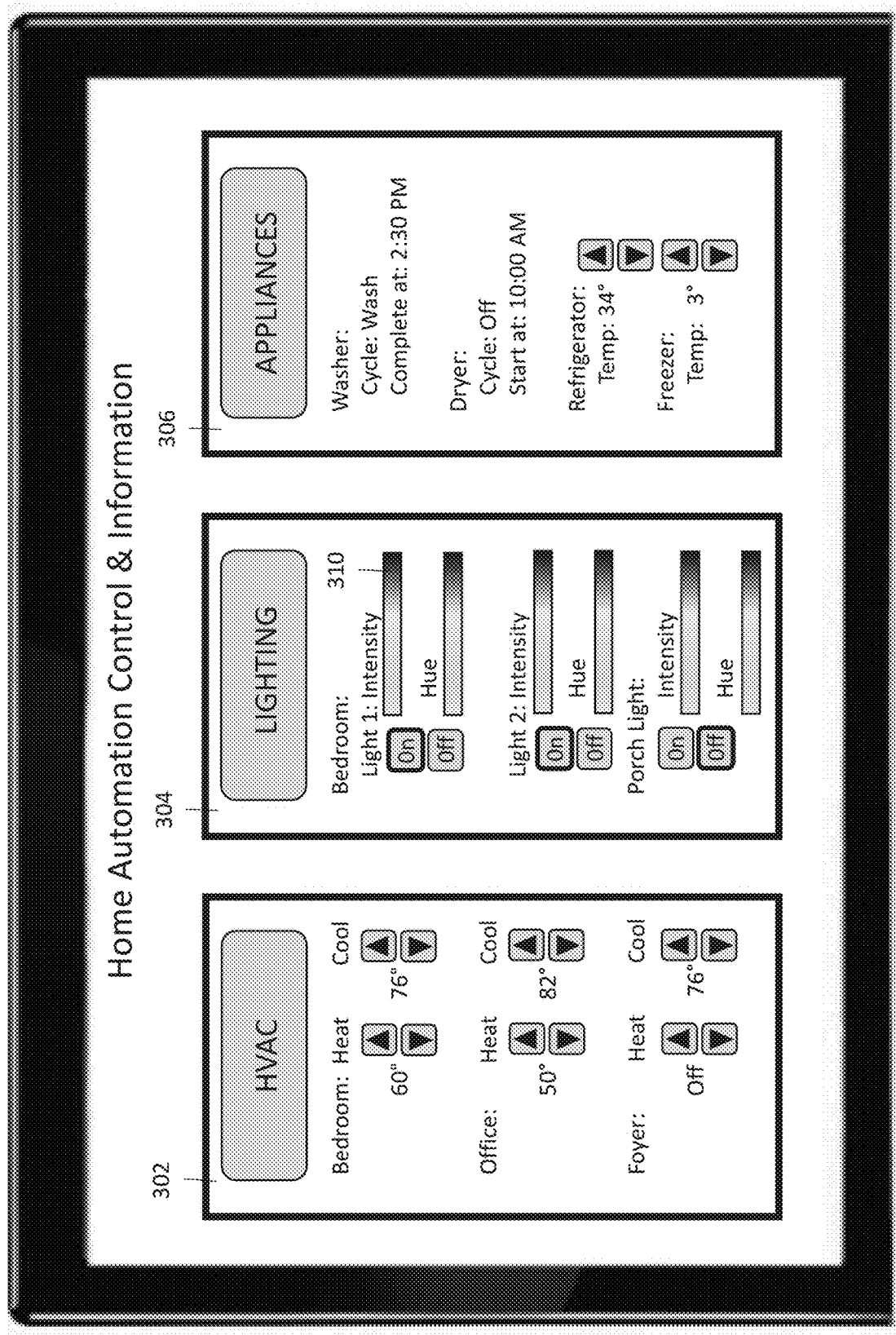
FIG. 3 is a diagram of a graphical user interface utilized in conjunction with the management system of FIG. 2.

A GUI such as that illustrated in FIG. 3 could be provided by media hub 202 upon a connected computer, such as laptop 214, a digital television (212) or a mobile device such as smartphone 220 (see FIG. 2). If a user were interfacing with media hub 202 via digital television 212, remote control 222 would serve as a pointing device. If a GUI similar that depicted in FIG. 3 was provided upon smartphone 222, the user would utilize the phone's touch screen to interact with media hub 202 and thereby control the connected IoT systems. The phone being connected to media hub 202 via a Wi-Fi connection.

Although the invention herein has been described with reference to particular embodiments, it is to be understood that these embodiments are merely illustrative of the principles and applications of the present invention. For example, the media hub can be adapted to communicate with much larger number of dissimilar IoT hubs and systems that the three depicted in FIG. 2. In addition, the GUI depicted in FIG. 3 is merely an example and it will be understood that numerous variations and extension thereof are possible, including multiple nested screens, screen specifically adapted for viewing and manipulation on mobile devices, etc. The type of user interface that can be utilized is also not intended to be limited to the specific types delineated above. Other types of displays and devices could be utilized, including but not limited to tablets, heads-up displays, etc. Furthermore, although communication between various components of the disclosed system was specified as being accomplished via wired Ethernet, or wireless Wi-Fi or Zig-Bee, it will be understood that any known form of wireless or wired communication that could support the transmission of the specified communications could be utilized for any of the connections (including Bluetooth and optical). In addition, although the media hub is depicted as a premises device, such as a set-top box, the functionality could be provided by a remote device networked with the various IoT hubs. All of the above variations and extensions could be implemented and practiced without departing from the spirit and scope of the present invention as defined by the appended claims.

The invention claimed is:

1. A system for the management of networked devices, the system comprising:
    a plurality of device hubs, each adapted to utilize a device-specific control protocol to communicate with at least one networked device utilizing, and a device-specific interface protocol to communicate with a user interface;
    a user interface; and
    a controller, comprising at least one processor and at least one memory, wherein:
        the memory stores information indicative of the device-specific interface protocols associated with each of the plurality of device hubs; and
        the at least one processor executing at least one process within a given operating system, the at least one processor adapted to:
            receive from at least one of the plurality of device hubs information encoded in accordance with device-specific interface protocol;
            identify the received device-specific interface protocol based, at least in part, on the information stored in the memory;
            convert the received information, encoded in accordance with device-specific interface protocol, into information conforming to a format compatible with the at least one process executing within a given operating system; and
            present information indicative of the converted received information upon the at least one user interface.

2. The system of claim 1 wherein the controller comprises a media hub.

3. The system of claim 1 wherein the at least one user interface comprises at least one of the following:
    a smartphone;
    a tablet;
    a television; and
    a computer display.

4. The system of claim 1 wherein the at least one networked device comprises at least one of the following:
    an environmental control system;
    a lighting device;
    an automobile;
    a household appliance;
    an information system; and
    an entertainment system.

5. The system of claim 1 wherein at least one of the plurality of device hubs is connected to the controller via at least one of:
    a wireless interface;
    an optical interface; and
    a wired interface.

6. The system of claim 1 wherein the controller is further adapted to:
    receive via the at least one user interface information indicative of a command intended for at least one networked device associated with at least one of the plurality of device hubs;
    convert the received information indicative of a command to a format encoded in accordance with device-specific interface protocol utilized by the at least one of the plurality of device hubs; and
    transmit the converted information indicative of a command to the at least one of the plurality of device hubs.

7. The system of claim 1 wherein the controller is linked to the user interface via a network.

8. The system of claim 7 wherein the network comprises the Internet.

9. A system for the management of networked devices, the system comprising:
    a plurality of device hubs, each adapted to utilize a device-specific control protocol to communicate with at least one networked device utilizing, and a device-specific interface protocol to communicate with a user interface; and
    a controller, comprising at least one processor and at least one memory, wherein:
        the memory stores information indicative of the device-specific interface protocols associated with the plurality of device hubs; and
        the at least one processor executing at least one process within a given operating system, the at least one processor adapted to:
            receive from a first device hub information encoded in accordance with a first device-specific interface protocol;
            receive from at least one other device hub information encoded in accordance with a device-specific interface that is different from the first device-specific interface protocol;
            identify the received device-specific interface protocols based, at least in part, on the information stored in the memory;
            convert the information received from the first device hub and from the at least one other device hub into information conforming to a format compatible with the at least one process executing within a given operating system; and
            process the converted information received from the first device hub based at least in part on the converted information received from the at least one other device hub.

10. The system of claim 9 wherein the controller comprises a media hub.

11. The system of claim 9 wherein the at least one networked device comprises at least one of the following:
    an environmental control system;
    a lighting device;
    an automobile;
    a household appliance;
    an information system; and
    an entertainment system.

12. The system of claim 9 wherein the controller is further adapted to:
    generate, based at least in part on the processing of the converted information, a command intended for at least one networked device associated with at least one of the plurality of device hubs;
    convert the generated command into a format encoded in accordance with device-specific interface protocol utilized by the at least one of the plurality of device hubs; and
    transmit the converted information indicative of the generated command to the at least one of the plurality of device hubs.

13. A method for the management of networked devices in a system comprising:
    a plurality of device hubs, each adapted to utilize a device-specific control protocol to communicate with at least one networked device utilizing, and a device-specific interface protocol to communicate with a user interface;

a user interface; and a controller, comprising at least one processor and at least one memory, wherein:

the memory stores information indicative of the device-specific interface protocols associated with each of the plurality of device hubs; and the at least one processor executing at least one process within a given operating system;

the method comprising the steps of:

receiving from at least one of the plurality of device hubs information encoded in accordance with device-specific interface protocol;

identifying the received device-specific interface protocol based, at least in part, on the information stored in the memory;

converting the received information, encoded in accordance with device-specific interface protocol, into information conforming to a format compatible with the at least one process executing within a given operating system; and presenting information indicative of the converted received information upon the at least one user interface.

14. The method of claim 13 wherein the controller comprises a media hub.

15. The method of claim 13 wherein the at least one user interface comprises at least one of the following:
a smartphone;
a tablet;
a television; and
a computer display.

16. The method of claim 13 wherein the at least one networked device comprises at least one of the following:
an environmental control system;
a lighting device;
an automobile;
a household appliance;
an information system; and
an entertainment system.

17. The method of claim 13 wherein at least one of the plurality of device hubs is connected to the controller via at least one of:
a wireless interface;
an optical interface; and
a wired interface.

18. The method of claim 13 further comprising the steps of:

receiving via the at least one user interface information indicative of a command intended for at least one networked device associated with at least one of the plurality of device hubs;

converting the received information indicative of a command to a format encoded in accordance with device-specific interface protocol utilized by the at least one of the plurality of device hubs; and transmitting the converted information indicative of a command to the at least one of the plurality of device hubs.

19. The method of claim 13 wherein the controller is linked to the user interface via a network.

20. The method of claim 19 wherein the network comprises the Internet.

21. A method for the management of networked devices in a system comprising:

a plurality of device hubs, each adapted to utilize a device-specific control protocol to communicate with at least one networked device utilizing, and a device-specific interface protocol to communicate with a user interface; and a controller, comprising at least one processor and at least one memory, wherein:

the memory stores information indicative of the device-specific interface protocols associated with the plurality of device hubs; and the at least one processor executing at least one process within a given operating system;

the method comprising the steps of:

receiving from a first device hub information encoded in accordance with a first device-specific interface protocol;

receiving from at least one other device hub information encoded in accordance with a device-specific interface that is different from the first device-specific interface protocol;

identifying the received device-specific interface protocols based, at least in part, on the information stored in the memory;

converting the information received from the first device hub and from the at least one other device hub into information conforming to a format compatible with the at least one process executing within a given operating system; and processing the converted information received from the first device hub based at least in part on the converted information received from the at least one other device hub.

22. The method of claim 21 wherein the controller comprises a media hub.

23. The method of claim 21 wherein the at least one networked device comprises at least one of the following:
an environmental control system;
a lighting device;
an automobile;
a household appliance;
an information system; and
an entertainment system.

24. The system of method of claim 21 further comprising the steps:

generating, based at least in part on the processing of the converted information, a command intended for at least one networked device associated with at least one of the plurality of device hubs;

converting the generated command into a format encoded in accordance with device-specific interface protocol utilized by the at least one of the plurality of device hubs; and transmitting the converted information indicative of the generated command to the at least one of the plurality of device hubs.

* * * * *